though a chloride of titanium, and particularly titanium tetrachloride, is a preferred material for use in the present invention, other metal chlorides can be used. For example, chlorides of the metals of groups IV, V, VI and VIII of the periodic table can be used. Preferably a chloride of zirconium, chromium, vanadium, molybdenum, hafnium, thorium, tantalum, tungsten, iron, cobalt or nickel is used. Chlorides of manganese can also be used. Since titanium tetrachloride is a preferred material, the invention is herein largely described in terms thereof.

2,938,019
POLYMERIZATION OF OLEFINS

Archibald P. Stuart, Media, Pa., assignor to Sun Oil Company, Philadelphia, Pa., a corporation of New Jersey
No Drawing. Filed July 14, 1958, Ser. No. 748,126
4 Claims. (Cl. 260—93.7)

This invention relates to the polymerization of olefins, and more particularly relates to the polymerization of normally gaseous olefins to high molecular weight solid polymers.

Catalytic systems effective for the polymerization of olefins such as propylene to solid polymers under relatively low temperature and pressure conditions have heretofore been described. For example, metal sub-chlorides such as titanium trichloride, which can advantageously be prepared by reducing titanium tetrachloride with an organic aluminum compound such as an aluminum alkyl, are effective for such polymerizations. However, products obtained in the heretofore described processes contain, in addition to the desired high molecular weight polymers, substantial yields of relatively low molecular weight materials. Such low molecular weight polymers can be removed from the desired high molecular weight polymers by dissolution in a hydrocarbon such as n-pentane or n-hexane and the quantity of material soluble in such hydrocarbons indicates the yield of undesirable low molecular weight materials obtained in such processes. For example, such heretofore described processes generally produce yields of at least 15% or more of solid material soluble in n-heptane.

An object of the present invention is to provide a new catalyst effective for polymerizing olefins to high molecular weight polymers. Another object is to provide a catalytic system effective for polymerizing olefins to high molecular weight polymers without concomitant formation of substantial quantities of low molecular weight polymers. A further object is to provide a process for the polymerization of normally gaseous olefins to high molecular weight solid polymers.

It has now been found that by incorporating a titanium iodide and titanium tetrachloride in an inert, liquid medium, and introducing a reducing agent into the resulting system, as hereinafter described, a catalytic system especially effective for polymerizing olefins to high molecular weight, solid polymers is produced.

Olefins which can be polymerized in accordance with the present invention are the alpha-olefins, i.e., olefins having a terminal olefinic bond. Generally olefins used have no more than about 12 carbon atoms, and normally gaseous olefins including ethylene, propylene, butene-1, butadiene 1,3, and mixtures thereof, give excellent results. The polymerization of propylene constitutes a preferred embodiment of the present invention, and hence the description of the invention hereinafter presented is largely directed to the polymerization of propylene.

In accordance with an embodiment of the invention, titanium tetraiodide and titanium tetrachloride are incorporated in an inert, liquid medium and the resulting system is contacted with a reducing agent. On such contacting, a finely divided solid phase including a sub-chloride of titanium is formed as a dispersion in the solvent, and this solid phase constitutes a catalytic component of the present invention.

Suitable inert liquids to use in the catalyst preparation include hydrocarbons such as the hexanes, heptanes, octanes, decanes, cyclohexanes, and the like, aromatic hydrocarbons, such as benzene, toluene, and xylene, and chlorinated hydrocarbons such as chlorobenzenes and chloronaphthalenes, and mixtures thereof. The liquid medium used for the catalyst preparation can also be used as the polymerization reaction medium.

Titanium tetraiodide is the preferred iodide to use, and hence the invention is herein largely described in terms thereof, it being understood that a titanium sub-iodide such as titanium diiodide can also be used. The use of titanium tetraiodide, together with an organo-aluminum compound but in the absence of a metal chloride, such as titanium tetrachloride, does not give comparable results in that large quantities, about 50% or more, of the polymer products consist of low molecular weight, hydrocarbon soluble polymers.

Metal-containing compounds are used as the reducing agent, organo-metallic compounds such as aluminum triethyl, aluminum triisopropyl, aluminum tri-n-hexyl, ethyl aluminum dichloride combined with aluminum triethyl, and the like, being preferred, but other metal alkyls, alkyl metal halides and metal hydrides, and combinations thereof, can also be used, such as the corresponding alkyls of beryllium, chromium, magnesium, lithium and lead. Metal alkyl halides which can be used include methylmagnesium bromide, ethylmagnesium chloride and the like, and metal hydrides which can be used include lithium hydride, lithium aluminum hydride and sodium hydride. Such reducing compounds serve not only to reduce the titanium tetrachloride, but also as an activator in the resulting catalytic system. The use of an alkyl metal halide as a reducing agent, followed by the addition of a metal alkyl, as above described, form preferred embodiments of the invention.

The catalytic system of the invention is prepared, as above-described, by dissolving or dispersing an iodide of titanium and a chloride of a metal of group IV, V, VI or VIII, or manganese, in an inert liquid. The metal of the metal chloride should be in a valence state other than its lowest valence state, i.e., the metal chloride should be reducible. A reducing agent is then added to the system. The quantity of the reducing agent used should be sufficient to reduce at least a substantial portion of the metal compound, such as titanium tetrachloride, to a lower valence state. Generally from about 1 to 10 or more moles per mole of such metal compound plus the iodide compound is used.

In a preferred embodiment of the invention, ethyl aluminum dichloride is first added as a reducing agent, and after reducing at least a substantial portion of the metal compound, the further addition of aluminum triethyl gives a catalytic system exhibiting especially high catalytic activity. For example, for each mole of titanium tetrachloride plus titanium tetraiodide, from 1 to 5 moles of ethyl aluminum dichloride is added. From 0.2 to 10 moles of aluminum triethyl is then incorporated in the resulting system to give a preferred catalytic system in accordance with the invention.

The titanium iodide can be present in very small quantities and good results obtained. For example, from 0.05 to 12 moles of such iodide per 100 moles of the group IV, V, VI or VII metal compound, such as titanium tetrachloride, gives good results.

After performing the reduction step, an additional quantity of the inert, liquid medium can be admixed therewith, if desired, to form a desired catalyst concentration. This concentration is not critical, and usually from about 500 to 5,000 parts of the liquid medium per part of catalyst is used. An olefin, preferably a normally gaseous olefin or mixture of such olefins, is then contacted with the catalytic system under polymerizing conditions. Contacting can be by bubbling the olefin into the suspension, or by introduction under pressure into an autoclave equipped with a mechanical stirrer and containing the polymerizing catalytic system. Substantially atmospheric temperatures and pressures are suitable, temperatures of from 0° C. to 200° C. being operable and pressures of from below atmospheric to 5,000 p.s.i.g. (pounds per square inch gauge) giving good results. A mildly elevated temperature of from about 50° C. to 100° C. and mildly elevated pressures of from about 50 to 300 p.s.i.g. are preferred.

After completion of the polymerization reaction or when the polymerization has proceeded to a desired extent, the reaction is stopped and the polymer product recovered by any desired means. For example, an alcohol such as methanol can be added to the reaction mixture to kill the catalytic activity of the catalyst and to remove a major proportion of the inorganic catalytic components. If desired, aqueous or alcoholic solutions of mineral acids such as hydrochloric acid or nitric acid can be contacted with the polymer to insure substantial removal of the inorganic catalytic components.

The reason why the present catalytic system is remarkably effective for polymerizing olefins is not known with certainty. It is believed that the presence of the titanium tetrachloride, or other metal compound as above-defined, in some way alters the crystal structure of the reduced compound, such as titanium trichloride, thereby giving a remarkably effective system for polymerizing olefins.

The solid polymer products of the process are high molecular weight solids, i.e., are solids having molecular weights of above about 10,000 and usually of from about 100,000 to 500,000, and are characterized by containing only a small amount of low molecular weight n-heptane soluble polymers. When propylene is polymerized, for example, the products will contain less than 15% of n-heptane soluble materials and less than 5% of n-heptane soluble materials (excluding n-pentane soluble materials). Using propylene, the preferred olefin of the invention, the n-heptane insoluble polymers have a regular configuration, are substantially crystalline, and have been designated "isotactic" polymers, while the n-heptane soluble polymers are generally of amorphous structure and have been designated "atactic" polymers. The isotactic polymers exhibit characteristics, such as relatively high melting points, which make them especially valuble, and hence high yields thereof are desired. With other olefins different solubilities are observed, but it is characteristic that the yields of relatively low molecular weight polymers are far below the yields thereof obtained in prior processes.

The following example illustrates the process of the invention:

Under substantially anhydrous and oxygen-free conditions, 0.3 gram of titanium tetraiodide in pulverized form was contacted with 2.02 grams of liquid titanium tetrachloride, the quantity of titanium tetraiodide being about 5 mole percent of the titanium tetrachloride, and the system was allowed to stand about 16 hours. A quantity of n-heptane, about 12 cc., was added to dissolve the titanium tetrachloride, and a quantity of ethyl aluminum dichloride was added to reduce the tetrahalides. The mole ratio of ethyl aluminum dichloride to titanium tetrachloride plus titanium tetraiodide was 3.6. On adding the ethyl aluminum dichloride a solid precipitate formed which was allowed to stand 30 minutes. To the resulting system were added about 2640 cc. of a mixture of paraffinic hydrocarbons consisting principally of octanes, 3.72 grams of aluminum triethyl and a quantity of propylene so that the concentration thereof in the system was 75 mole percent. The temperature of the reaction mixture was maintained from 91° C. to 95° C. for 1.35 hours. Methanol was then added to kill the catalytic activity and, after filtering, the polymer product was comminuted in the presence of methanol. After separation of methanol and methanol soluble materials, the polymer was extracted with n-pentane, extracted with n-heptane, and dried in an oven at from 90° C. to 95° C. for 2 hours. The rate of production of solid polymer was 0.16 pound per gallon of reactor capacity per hour. The molecular weight was 310,000. The total pentane soluble materials was about 11%, based on the quantity of polymers produced, and the $C_7$ soluble materials was 2%. Thus, 87% of the polymers produced were isotactic.

Repeating the above procedure, except omitting the titanium tetraiodide results in a similar product which, however, contains 17.6% of materials soluble in n-pentane and 4 parts of material soluble in n-heptane. Thus, only 78.4% of the polymers produced were isotactic.

Various other halides were substituted for the titanium tetraiodide in the procedure of the example, including chlorides of tin, vanadium, molybdenum, tungsten, and chromium, and in none of these instances was any improvement observed and, particularly with tin chloride and vanadium chloride, such addition appeared to have a deleterious effect on the process especially in greatly hindering the rate of polymerization. Substituting titanium diiodide, however, gives good results which are substantially equivalent to the results above-obtained.

The invention claimed is:
1. Process for the polymerization of olefins which comprises contacting, under polymerization conditions, an olefin selected from the group consisting of ethylene, propylene, and butene-1 with a catalytic system prepared by incorporating titanium tetrachloride and titanium tetraiodide in an inert liquid hydrocarbon medium in a mol ratio of tetraiodide to tetrachloride of from 0.0005 to 0.12, contacting the resulting system with ethyl aluminum dichloride in a mol ratio of dichloride to tetrachloride plus tetraiodide of from 1 to 5, and thereafter with aluminum triethyl in a mol ratio of triethyl to tetrachloride plus tetraiodide of from 0.2 to 10.

2. The process according to claim 1 in which the olefin is propylene.

3. A new catalytic system effective for polymerizing olefins prepared by incorporating titanium tetrachloride and titanium tetraiodide in an inert hydrocarbon medium in a mol ratio of tetraiodide to tetrachloride of from 0.0005 to 0.12, contacting the resultant system with ethyl aluminum dichloride in a mol ratio of dichloride to tetrachloride plus tetraiodide of from 1 to 5, and thereafter with aluminum triethyl in a mol ratio of triethyl to tetrachloride plus tetraiodide of from 0.2 to 10.

4. Process for the preparation of a new catalytic system effective for polymerizing olefins which comprises incorporating titanium tetrachloride and titanium tetraiodide in an inert hydrocarbon medium in a mol ratio of tetraiodide to tetrachloride of from 0.0005 to 0.12, contacting the resultant system with ethyl aluminum dichloride in a mol ratio of dichloride to tetrachloride plus tetraiodide of from 1 to 5, and thereafter with aluminum triethyl in a mol ratio of triethyl to tetrachloride plus tetraiodide of from 0.2 to 10.

References Cited in the file of this patent
UNITED STATES PATENTS

| | | |
|---|---|---|
| 2,827,446 | Breslow | Mar. 18, 1958 |
| 2,827,447 | Nowlin | Mar. 18, 1958 |

FOREIGN PATENTS

| | | |
|---|---|---|
| 538,782 | Belgium | Dec. 6, 1955 |